US008553868B2

(12) United States Patent
Smelyansky (10) Patent No.: US 8,553,868 B2
(45) Date of Patent: Oct. 8, 2013

(54) INTELLIGENT OUTBOUND CALLING (75) Inventor: Vladimir Smelyansky, Glenview, IL (US)

(73) Assignee: Xcast Labs, Inc., Northfield, IL (US)

( * ) Notice: Subject to any disclaimer, the term of this patent is extended or adjusted under 35 U.S.C. 154(b) by 405 days.

(21) Appl. No.: 12/720,336

(22) Filed: Mar. 9, 2010

(65) Prior Publication Data

US 2010/0232590 A1    Sep. 16, 2010

Related U.S. Application Data (60) Provisional application No. 61/159,153, filed on Mar. 11, 2009.

(51) Int. Cl.
*H04M 3/46* (2006.01)
(52) U.S. Cl.
USPC .................................. 379/211.03; 379/216.01
(58) Field of Classification Search
USPC .............. 379/216.01, 211.03, 207.05, 207.09
See application file for complete search history.

(56) References Cited

U.S. PATENT DOCUMENTS

| 5,495,522 | A  | * | 2/1996  | Allen et al. | 379/202.01 |
| 2004/0235458 | A1 | * | 11/2004 | Walden et al. | 455/414.1 |
| 2007/0064909 | A1 | * | 3/2007  | Levy et al. | 379/211.03 |
| 2010/0172484 | A1 | * | 7/2010  | Leung et al. | 379/216.01 |

OTHER PUBLICATIONS

International Search Report issued in PCT/US2010/026846, dated May 11, 2010.

* cited by examiner

*Primary Examiner* — Amal Zenati
(74) *Attorney, Agent, or Firm* — Smith, Gambrell & Russell LLP (57) ABSTRACT

A method, system, and computer program product for providing Intelligent Outbound Calling provides enhanced calling services even when the called party is not a customer to such a service. A method for providing calling services may comprise storing contact information for a customer, the contact information comprising information relating to a plurality of contacts associated with the customer and for each contact, a plurality of contact telephone numbers, receiving an indication of a contact selected from among the plurality of contacts, and dialing a plurality of calls to the plurality of contact telephone numbers for the selected contact.

23 Claims, 5 Drawing Sheets

| 202 CONTACT | 204 NAME | 206 DIALING RULE |
|---|---|---|
| 208 BUSINESS | 210 (555) 555-1234 X 123 | 212 DELAY 10 SEC., RING 20 SEC |
| 214 HOME | 216 (555) 555-2831 | 218 DELAY 0 SEC., RING 40 SEC |
| 220 MOBILE | 222 (555) 555-1517 | 224 DELAY 10 SEC., RING 30 SEC |

| 202<br>CONTACT | 204<br>NAME | 206<br>DIALING RULE |
|---|---|---|
| 208<br>BUSINESS | 210<br>(555) 555-1234 X 123 | 212<br>DELAY 10 SEC., RING 20 SEC |
| 214<br>HOME | 216<br>(555) 555-2831 | 218<br>DELAY 0 SEC., RING 40 SEC |
| 220<br>MOBILE | 222<br>(555) 555-1517 | 224<br>DELAY 10 SEC., RING 30 SEC |

INTELLIGENT OUTBOUND CALLING

CROSS-REFERENCE TO RELATED APPLICATIONS

This application claims the benefit of Provisional Application No. 61/159,153, filed Mar. 11, 2009, the contents of which are incorporated herein in their entirety.

BACKGROUND OF THE INVENTION

1. Field of the Invention

The present invention relates to a method, system, and computer program product for providing Intelligent Outbound Calling even when the called party is not a customer to such a service.

2. Description of the Related Art

Currently there are a number of enhanced call handling services available. For example, "find-me" and "follow-me" services provide the capability for a caller to a customer to the service to be connected to the customer even if the customer is at a different location. To call such a customer, a calling party typically dials one telephone number associated with the customer, and the service dials one or more other telephone numbers in an attempt to find or follow the customer. However, such services are not currently available if the called party is not a customer to such a service. A need arises for a technique by which such enhanced call handling services can be provided even when the called party is not a customer to such a service.

SUMMARY OF THE INVENTION

A method, system, and computer program product for providing Intelligent Outbound Calling provides enhanced calling services even when the called party is not a customer to such a service.

For example, a method for providing calling services may comprise storing contact information for a customer, the contact information comprising information relating to a plurality of contacts associated with the customer and for each contact, a plurality of contact telephone numbers, receiving an indication of a contact selected from among the plurality of contacts, and dialing a plurality of calls to the plurality of contact telephone numbers for the selected contact.

The contact information may be stored in a telecommunications switch or server, the indication of a contact is received by the telecommunications switch or server from an external device, and the telecommunications switch or server dials the plurality of calls. The external device may be a wired hardware telephone, a wireless hardware telephone, a wired smartphone, a wireless smartphone, or a computer system. A user of the external device may select the contact by entering a speed dial code, selecting a special function key, selecting the contact from a menu, selecting the contact from a phonebook, or selecting a link in a page.

The contact information may be stored in a telephone device comprising a wired hardware telephone, a wireless hardware telephone, a wired smartphone, a wireless smartphone, or a computer system, the indication of a contact is received by the telephone device from a user, and the telephone device dials the plurality of calls. A user of the telephone device may select the contact by entering a speed dial code, selecting a special function key, selecting the contact from a menu, selecting the contact from a phonebook, or selecting a link in a page.

The contact information may further comprise at least one dialing rule associated with each contact telephone number, each dialing rule defining a dialing behavior for each contact telephone number, and the step of dialing the plurality of calls comprises dialing the plurality of calls based on the dialing rules. Each dialing rule may comprise a time to delay before dialing the contact telephone number, and a time to wait for a call to the contact telephone number to be answered.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method, system, and computer program product for providing Intelligent Outbound Calling provides enhanced calling services even when the called party is not a customer to such a service.

Figure 1:
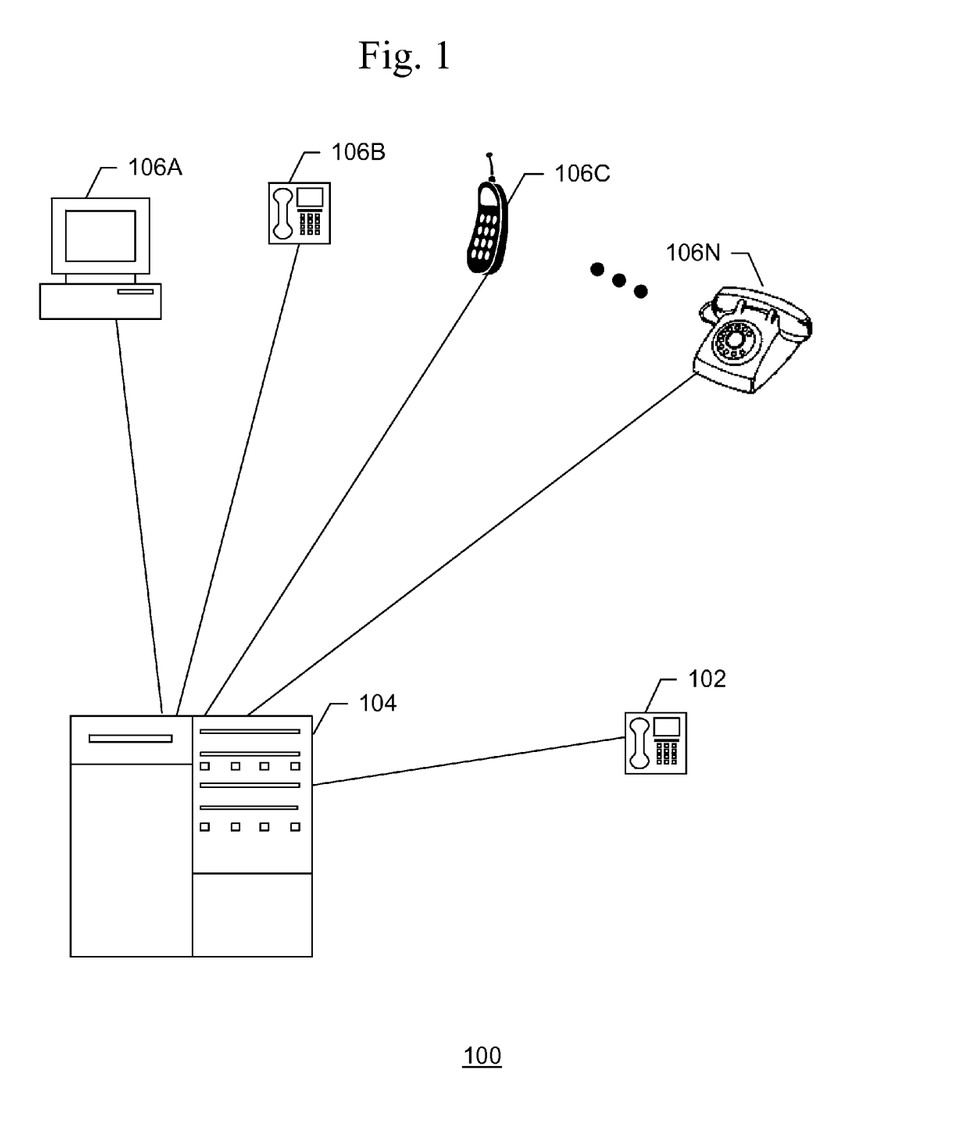
FIG. 1 is an exemplary diagram of block diagram of a network system in which the present invention may be implemented.

As an example, such features may be provided in a system 100, such as that shown in FIG. 1. FIG. 1 shows a calling party device 102, a telecommunications switch or server 104, and a plurality of called party devices 106A-N. Calling party device 102 and called party devices 106A-N may include any device capable of telephone functionality by transmitting audio and/or video to and from another such device, such as a wired or wireless hardware telephone or smartphone, or a software based phone client running on a computer system. Telecommunications switch or server 104 is a device that provides telecommunications switching and connection capability, such as a telephone Private Branch Exchange (PBX), a telephone Central Office (CO) switch, a Voice-over-Internet Protocol (VoIP) switch, etc.

Figure 2:
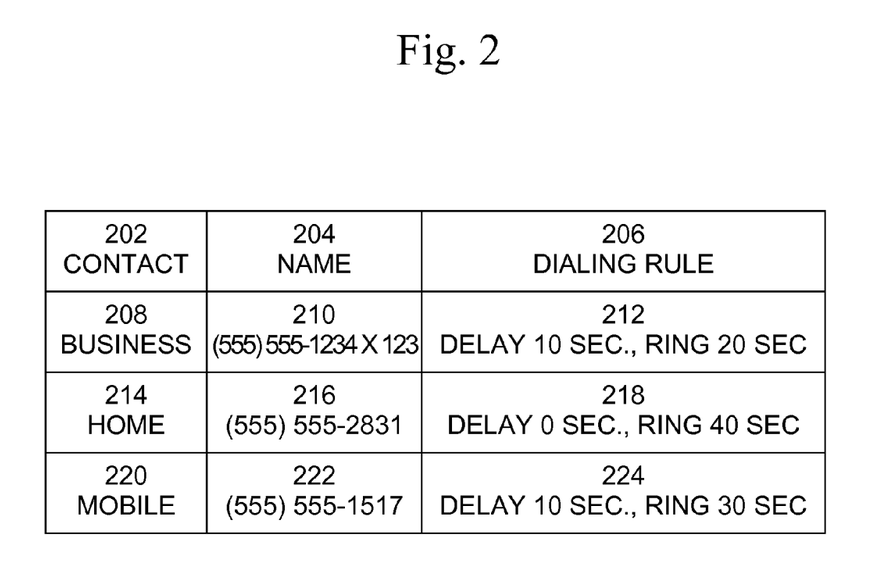
FIG. 2 is an exemplary format of contact information.

Telecommunications switch or server 104 includes, or is connected to a device that provides, contact information associated with customers to the telecommunications services provided by telecommunications switch or server 104. An example of such contact information 200 is shown in FIG. 2. Typically, contact information 200 is included in a phonebook or other profile information belonging to a customer of the service provided by telecommunications switch or server 104. Contact information 200 may include contact IDs 202, contact name 204, and dialing rules 206. Contact IDs 202 may include a plurality of different sets of contact information for each person identified by the contact name. In the example shown in FIG. 2, there is a business contact 208, a corresponding business telephone number 210, and an associated dialing rule 212 for the business contact. Likewise, there is a home contact 214, a corresponding home telephone number 216, and an associated dialing rule 218 for the home contact, and there is a mobile contact 220, a corresponding mobile telephone number 222, and an associated dialing rule 224 for the mobile contact. Dialing rules 212, 218, and 224 include rules defining the dialing behavior for each contact telephone number. Typically, the dialing rules define a time delay before the associated contact telephone number is dialed and the time to wait for the call to be answered, and may include other behavior-controlling information, such as the order in which the contact telephone numbers are to be dialed, whether each call is to be dialed in parallel with one or more other calls or whether each call is to be dialed sequentially, etc. Typically, the contact information is entered by the customer to whom the phonebook or other profile information belongs. Alternatively, or in addition, some or all of the contact information may be automatically populated or otherwise automatically entered.

Figure 3:
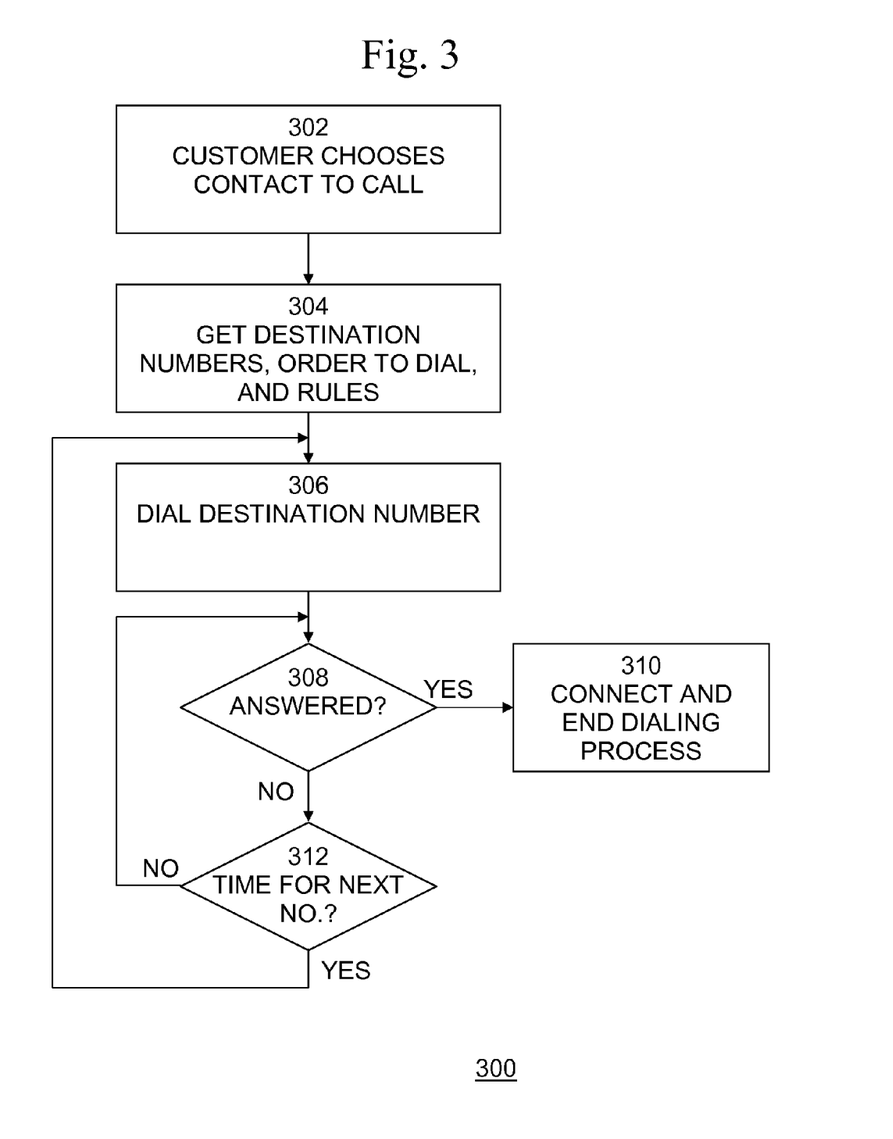
FIG. 3 is an exemplary flow diagram of a process for Intelligent Outbound Calling.

An example of the flow of a process 300 for Intelligent Outbound Calling is shown in FIG. 3. It is best viewed in conjunction with FIGS. 1 and 2. In step 302, a customer of the telecommunications service provided by telecommunications switch or server 104 selects a contact to place a call to using calling party device 102. For example, the customer may access contact information in their phonebook or other profile information, and select a contact included therein. For example, if calling party device 102 is a hardware telephone device, the customer may select the contact in a number of ways, for example, by dialing a speed dial code, by selecting a special function key on the telephone device, or by selecting a contact from a menu displayed by the telephone device. If calling party device is a computer system, smartphone, or similar device, the customer may select the contact in a number of ways, for example, by selecting the contact from a phonebook displayed on the computer system, smartphone, or similar device, or in ways, by selecting a link in a page, such as a web page, displayed on the computer system, smartphone, or similar device, or in ways that may be similar to those provided by a hardware telephone device.

In step 304, telecommunications switch or server 104 accesses contact information 200 and obtains the destination telephone numbers to dial, such as numbers 210, 216, and 222, the order in which to dial the numbers, which may be explicitly defined in the rules or another data field, or which may be implicit in the order in which the contacts are listed, and the dialing rules defining the dialing behavior for each contact telephone number, such as dialing rules 212, 218, and 224. In step 306, telecommunications switch or server 104 dials the currently selected contact telephone number. Of course, at the beginning of the process, this is the first contact telephone number. For example, the first call may be to home contact telephone number 216, which may correspond to called party device 106N, which has a dialing rule 218 defining a delay of 0 seconds (immediate dialing), and a ring or answer waiting time of 40 seconds.

In step 308, telecommunications switch or server 104 determines whether or not any of the currently pending calls has been answered. If, in step 308, it is determined that one of the currently pending calls has been answered, then the process continues with step 310, in which the call that has been answered is connected and the dialing process is ended by terminating all other currently pending calls. If, in step 308, it is determined that none of the currently pending calls has been answered, then the process continues with step 312, in which it is determined, based on the dialing rules, whether it is now time for another call to be dialed. If, in step 312, it is determined that it is not time for another call to be dialed, then the process loops back to step 308. If, in step 312, it is determined that it is now time for another call to be dialed, then the process loops back to step 306, and the next contact telephone number is dialed. Process 300 will terminate when one of the dialed calls is answered and connected. Alternatively, process 300 will terminate when calls to all contact telephone numbers have been dialed and the ring or answer waiting time for all such calls in the contact list have expired without any having been answered.

Continuing the example described above, if after 10 seconds, the call placed to home contact telephone number 216 has not been answered, then, based on dialing rules 212 and 224, telecommunications switch or server 104 will dial calls to business contact telephone number 210, which may correspond to called party device 106B, and mobile contact telephone number 220, which may correspond to called party device 106C, in parallel.

The Intelligent Outbound Calling service may be configured and accessed in a number of ways. For example, assume that a customer has a contact in included in the customer's contact information who routinely answers from one of any number of devices, such as office, home, mobile. The contact may be added to the contact list using a Speed Dial code (such as 22). In one example, the customer dials the Speed Dial code and all destination numbers for that contact are dialed, either simultaneously or sequentially, as defined in the dialing rules in the contact information, or according to default dialing rules. This eliminates the need for the customer to dial one number at a time to find where contact is.

In another example, the customer dials the Speed Dial code followed by a code indicating the particular contact telephone number to dial. For example, the letter "M" ("6" on a telephone keypad) may indicated the mobile contact telephone number 222, the letter "H" ("4" on a telephone keypad) may indicated the home contact telephone number 216, and the letter "B" ("2" on a telephone keypad) may indicated the business contact telephone number 210. So if the customer wants to call the contact Mobile phone only, the customer dials the Speed Dial code (22) plus the mobile code (6), or 226. But, if the customer wants to dial all destinations for the contact, the customer will dial only 22.

In another example, the order of dialing can be configured based on dialing rules: dial home phone first for 8 rings or 40 seconds, start dialing cell phone 5 seconds after home phone started ringing for only 4 rings or 20 second, start dialing office phone 5 seconds after cell phone (10 after home) for 4 rings or 20 second. These rules could become the default setting for all contacts with the ability to overwrite for any particular destination from our customer Phone Book.

Implementation of the Intelligent Outbound Calling in a telecommunications switch or server is merely one example. Current mobile phones, smartphones, and other devices are relatively powerful computers that can support provision of the Intelligent Outbound Calling service. The current contact lists offered in cell phones in the market are very extensive and contain email address, as well as different telephone numbers, such as office, business, mobile, etc. Intelligent Outbound Calling can be added to Speed Dial already available in mobile phones and other devices. For example, each Speed Dial number may be associated with contact information and to the M/H/B (6/4/2) codes described above may be used to dial the appropriate phone for that contact.

Figure 4:
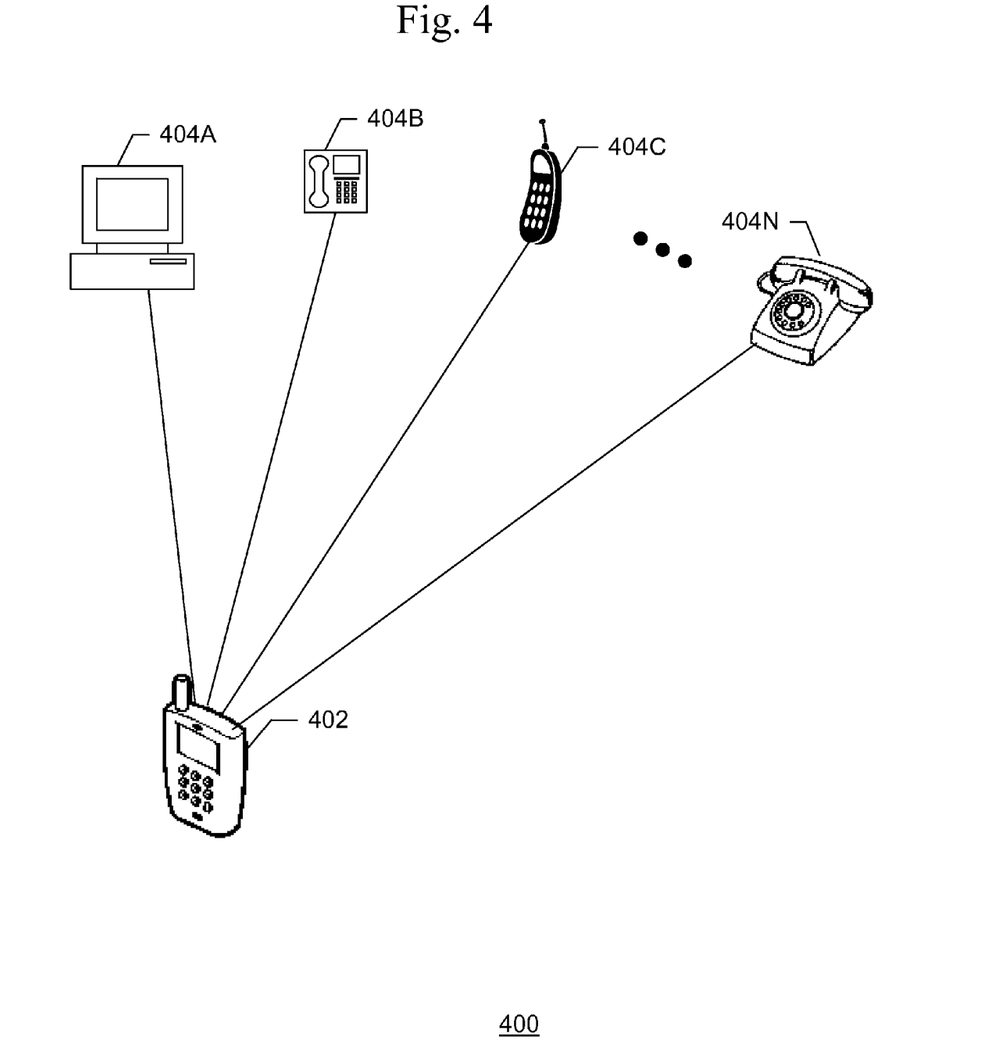
FIG. 4 is an exemplary block diagram of Intelligent Outbound Calling implemented in a mobile phone or other device.

An example 400 of Intelligent Outbound Calling implemented in a mobile phone or other device is shown in FIG. 4. It is best viewed in conjunction with FIG. 2. FIG. 4 shows a calling party device 402 and a plurality of called party devices 106A-N. Calling party device may be a mobile phone, smartphone, computer system or other device that is capable of storing and accessing contact information, such as that shown in FIG. 2, and of dialing multiple telephone numbers, either sequentially or in parallel. Called party devices 106A-N may include any device capable of telephone functionality by transmitting audio and/or video to and from another such device, such as a wired or wireless hardware telephone or smartphone, or a software based phone client running on a computer system.

In operation, a customer would select a contact to dial using calling party device 402. The contact may be selected by entering a Speed Dial code associated with the selected contact, such as "22", using the keypad or using voice recognition, or by selecting a contact using visual menus displayed by, and/or audio menus played by calling party device 402. For example, upon selection of contact 202, calling party device 402 would access contact information 200 and accesses contact information 200 and obtain the destination telephone numbers to dial, such as numbers 210, 216, and 222, the order in which to dial the numbers, which may be explicitly defined in the rules or another data field, or which may be implicit in the order in which the contacts are listed, and the dialing rules defining the dialing behavior for each contact telephone number, such as dialing rules 212, 218, and 224. Calling party device 402 dials the currently selected contact telephone number. Of course, at the beginning of the process, this is the first contact telephone number. For example, the first call may be to home contact telephone number 216, which may correspond to called party device 106N, which has a dialing rule 218 defining a delay of 0 seconds (immediate dialing), and a ring or answer waiting time of 40 seconds. If after 10 seconds, the call placed to home contact telephone number 216 has not been answered, then, based on dialing rules 212 and 224, calling party device 402 will dial calls to business contact telephone number 210, which may correspond to called party device 106B, and mobile contact telephone number 220, which may correspond to called party device 106C, in parallel.

Additional services may be provided using the feature framework. For example, the communication technology may not be limited to telephone connections, but other communication technologies, such as email and instant messaging could be used as well. For example, Speed Dial phone link could be extended to Speed Dial contact link. In this example, a customer could dial a Speed Dial code (22) plus a code indicating email (E or 3 on the keypad) and an email would be sent to one or more email addresses associated with the contact. Likewise, a customer could dial a Speed Dial code (22) plus a code indicating email (S or 7 on the keypad) and an instant message would be sent to one or more Short Message Service (SMS) or other instant message addresses associated with the contact. These non-telephone connection technologies could also be added to the dialing rules in the contact information. For example, if none of the contact telephone numbers were answered and all ring or answer waiting times had expired, the dialing rules could be configured to send an email and/or instant message to the contact.

Figure 5:
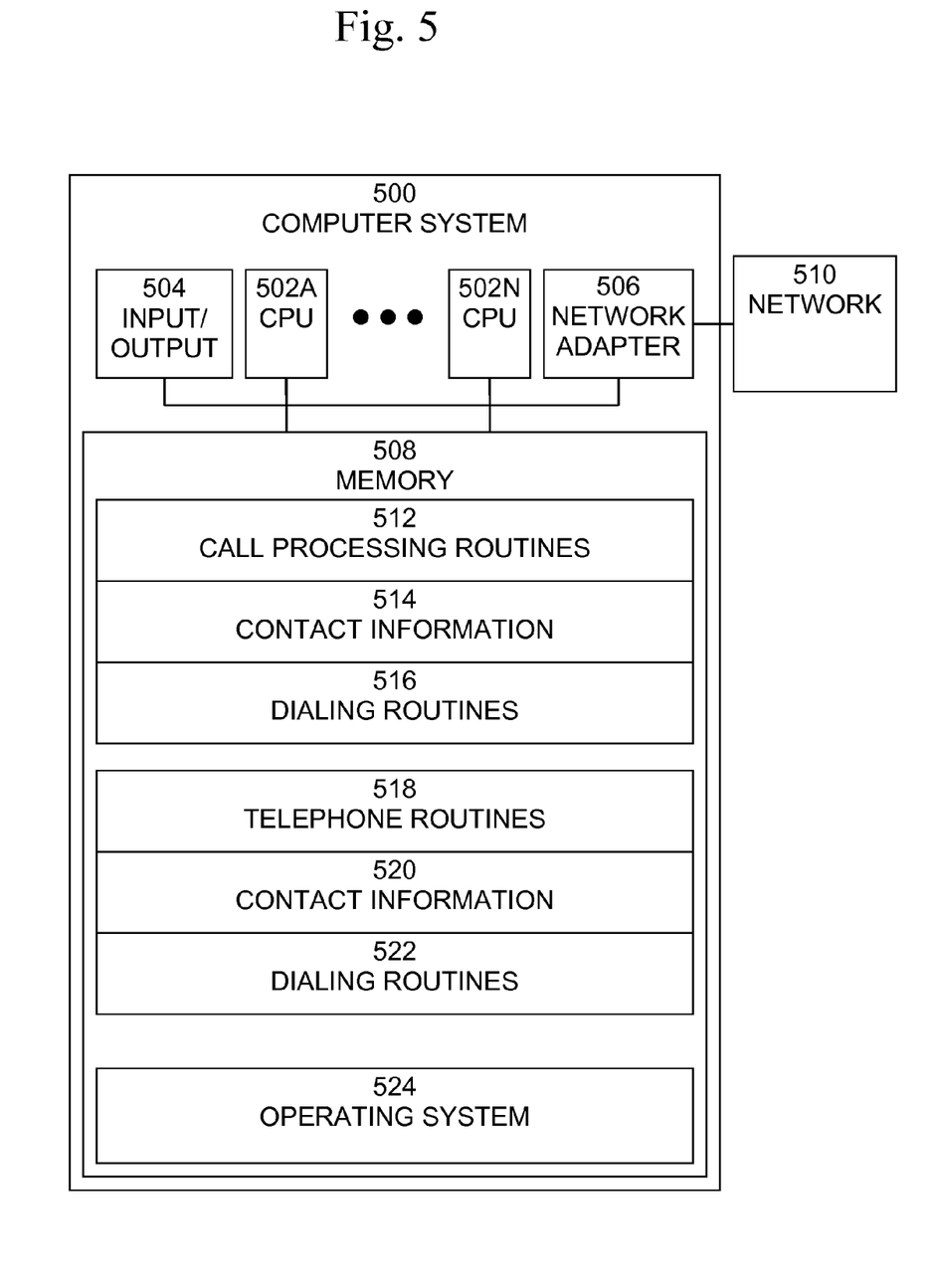
FIG. 5 is an exemplary block diagram of a computer system, such as a telecommunications switch or server, or a mobile phone, smartphone, or other device, in which the present invention may be implemented.

An exemplary block diagram of a computer system 500, such as a telecommunications switch or server, or a mobile phone, smartphone, or other device, is shown in FIG. 5. Computer system 500 is typically a programmed general-purpose computer system, such as a personal computer, workstation, server system, and minicomputer or mainframe computer. Computer system 500 includes one and may include a plurality of processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present invention also contemplates embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with network 510. Network 510 includes any communications network that is now in service or which may be developed in the future. Such a network may include one or more public or private communications networks, such as the Internet, wired or wireless telephone networks, wired or wireless data networks, local area networks, etc.

Memory 508 stores program instructions that are executed by, and data that are used and processed by, CPU 502 to perform the functions of computer system 500. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The contents of memory 508 varies depending upon the function that computer system 500 is programmed to perform. For example, where computer system 500 is a telecommunications switch or server, memory 508 may include call processing routines 512 and associated data, contact information 514, and dialing routines 516. Call processing routines 512 and associated data provide call processing and control functions such as setting up and connecting calls, detecting call progress conditions, forwarding calls, etc. Such call processing may be performed in conjunction with an external switch or server, or the call processing may be integrated with the computer system 500. Contact information 514 may include contact IDs, contact name, and dialing rules. Contact IDs may include a plurality of different sets of contact information for each person identified by the contact name is included in a phonebook or other profile information belonging to a customer of the service provided by the telecommunications switch or server. Contact information 514 may be included in a phonebook or other profile information belonging to a customer of the service provided by the telecommunications switch or server. Dialing routines 516 are software that accesses contact information 514 and dials the contact telephone numbers according to the dialing rules.

As another example, where computer system 500 is a mobile phone, smartphone, or other device, memory 508 may include telephone routines 518 and associated data, contact information 520, and dialing routines 522. Telephone routines 518 and associated data provide telephone processing and control functions such as setting up and connecting calls, detecting call progress conditions, forwarding calls, etc. Contact information 520 may include contact IDs, contact name, and dialing rules. Contact IDs may include a plurality of different sets of contact information for each person identified by the contact name is included in a phonebook or other profile information belonging to the user of the device. Contact information 520 may be included in a phonebook or other profile information belonging to the user of the device. Dialing routines 516 are software that accesses contact information 522 and dials the contact telephone numbers according to the dialing rules.

Operating system 524 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing calling services comprising:
storing, in a telecommunications switch or server, contact information for a customer, the contact information comprising information relating to a plurality of contacts associated with the customer and for each contact, a plurality of contact telephone numbers, wherein the contact information further comprises at least one dialing rule associated with each contact telephone number, each dialing rule defining a dialing behavior for each contact telephone number, the at least one dialing rule specifying at least one of sequential dialing, parallel dialing, and combined sequential and parallel dialing;
receiving, by the telecommunications switch or server from an external device, an indication of a contact selected from among the plurality of contacts, by entering a dial code; and
dialing, by the telecommunications switch or server, a plurality of calls to the plurality of contact telephone numbers for the selected contact based on the dialing rule;
wherein each dialing rule comprises a time to delay before dialing the contact telephone number, and a time to wait for a call to the contact telephone number to be answered, and
wherein if none of the contact telephone numbers are answered and all ring or answer waiting times have expired, the dialing rules are configurable to send an email or instant message to the contact.

2. The method of claim 1, wherein the contact information is stored in a telecommunications switch or server, the indication of a contact is received by the telecommunications switch or server from an external device, and the telecommunications switch or server dials the plurality of calls.

3. The method of claim 2, wherein the external device is a wired hardware telephone, a wireless hardware telephone, a wired smartphone, a wireless smartphone, or a computer system.

4. The method of claim 3, wherein a user of the external device selects the contact by entering a speed dial code, selecting a special function key, selecting the contact from a menu, selecting the contact from a phonebook, or selecting a link in a page.

5. The method of claim 1, wherein the contact information is stored in a telephone device comprising a wired hardware telephone, a wireless hardware telephone, a wired smartphone, a wireless smartphone, or a computer system, the indication of a contact is received by the telephone device from a user, and the telephone device dials the plurality of calls.

6. The method of claim 5, wherein a user of the telephone device selects the contact by entering a speed dial code, selecting a special function key, selecting the contact from a menu, selecting the contact from a phonebook, or selecting a link in a page.

7. The method of claim 6, wherein each dialing rule comprises a time to delay before dialing the contact telephone number, and a time to wait for a call to the contact telephone number to be answered.

8. A computer program product for providing calling services comprising a non-transitory computer readable storage medium and computer program instructions, recorded on the non-transitory computer readable medium and executable by a processor, for performing the steps of:
storing, in a telecommunications switch or server, contact information for a customer, the contact information comprising information relating to a plurality of contacts associated with the customer and for each contact, a plurality of contact telephone numbers, wherein the contact information further comprises at least one dialing rule associated with each contact telephone number, each dialing rule defining a dialing behavior for each contact telephone number, the at least one dialing rule specifying at least one of sequential dialing, parallel dialing, and combined sequential and parallel dialing;

receiving, by the telecommunications switch or server from an external device, an indication of a contact selected from among the plurality of contacts, by entering a dial code; and dialing, by the telecommunications switch or server, a plurality of calls to the plurality of contact telephone numbers for the selected contact based on the dialing rule;

wherein each dialing rule comprises a time to delay before dialing the contact telephone number, and a time to wait for a call to the contact telephone number to be answered, and wherein if none of the contact telephone numbers are answered and all ring or answer waiting times have expired, the dialing rules are configurable to send an email or instant message to the contact.

9. The computer program product of claim 8, wherein the contact information is stored in a telecommunications switch or server, the indication of a contact is received by the telecommunications switch or server from an external device, and the telecommunications switch or server dials the plurality of calls.

10. The computer program product of claim 9, wherein the external device is a wired hardware telephone, a wireless hardware telephone, a wired smartphone, a wireless smartphone, or a computer system.

11. The computer program product of claim 10, wherein a user of the external device selects the contact by entering a speed dial code, selecting a special function key, selecting the contact from a menu, selecting the contact from a phonebook, or selecting a link in a page.

12. The computer program product of claim 8, wherein the contact information is stored in a telephone device comprising a wired hardware telephone, a wireless hardware telephone, a wired smartphone, a wireless smartphone, or a computer system, the indication of a contact is received by the telephone device from a user, and the telephone device dials the plurality of calls.

13. The computer program product of claim 12, wherein a user of the telephone device selects the contact by entering a speed dial code, selecting a special function key, selecting the contact from a menu, selecting the contact from a phonebook, or selecting a link in a page.

14. The computer program product of claim 13, wherein each dialing rule comprises a time to delay before dialing the contact telephone number, and a time to wait for a call to the contact telephone number to be answered.

15. A telecommunications switch or server comprising a processor operable to execute computer program instructions, a memory operable to store computer program instructions executable by the processor, and computer program instructions stored in the memory and executable to perform the steps of:

storing, in a telecommunications switch or server, contact information for a customer, the contact information comprising information relating to a plurality of contacts associated with the customer and for each contact, a plurality of contact telephone numbers, wherein the contact information further comprises at least one dialing rule associated with each contact telephone number, each dialing rule defining a dialing behavior for each contact telephone number, the at least one dialing rule specifying at least one of sequential dialing, parallel dialing, and combined sequential and parallel dialing;

receiving, by the telecommunications switch or server from an external device, an indication of a contact selected from among the plurality of contacts, by entering a dial code; and dialing, by the telecommunications switch or server, a plurality of calls to the plurality of contact telephone numbers for the selected contact based on the dialing rule;

wherein each dialing rule comprises a time to delay before dialing the contact telephone number, and a time to wait for a call to the contact telephone number to be answered, and wherein if none of the contact telephone numbers are answered and all ring or answer waiting times have expired, the dialing rules are configurable to send an email or instant message to the contact.

16. The telecommunications switch or server of claim 15, wherein the indication of a contact is received by the telecommunications switch or server from an external device.

17. The telecommunications switch or server of claim 16, wherein the external device is a wired hardware telephone, a wireless hardware telephone, a wired smartphone, a wireless smartphone, or a computer system.

18. The telecommunications switch or server of claim 17, wherein a user of the external device selects the contact by entering a speed dial code, selecting a special function key, selecting the contact from a menu, selecting the contact from a phonebook, or selecting a link in a page.

19. The telecommunications switch or server of claim 18, wherein each dialing rule comprises a time to delay before dialing the contact telephone number, and a time to wait for a call to the contact telephone number to be answered.

20. A telephone device comprising a processor operable to execute computer program instructions, a memory operable to store computer program instructions executable by the processor, and computer program instructions stored in the memory and executable to perform the steps of:

storing, in a telecommunications switch or server, contact information for a customer, the contact information comprising information relating to a plurality of contacts associated with the customer and for each contact, a plurality of contact telephone numbers, wherein the contact information further comprises at least one dialing rule associated with each contact telephone number, each dialing rule defining a dialing behavior for each contact telephone number, the at least one dialing rule specifying at least one of sequential dialing, parallel dialing, and combined sequential and parallel dialing;

receiving, by the telecommunications switch or server from an external device, an indication of a contact selected from among the plurality of contacts, by entering a dial code; and dialing, by the telecommunications switch or server, a plurality of calls to the plurality of contact telephone numbers for the selected contact based on the dialing rule;

wherein each dialing rule comprises a time to delay before dialing the contact telephone number, and a time to wait for a call to the contact telephone number to be answered, and wherein if none of the contact telephone numbers are answered and all ring or answer waiting times have expired, the dialing rules are configurable to send an email or instant message to the contact.

21. The telephone device product of claim 20, wherein the telephone device is a wired hardware telephone, a wireless hardware telephone, a wired smartphone, a wireless smartphone, or a computer system.

22. The telephone device of claim 21, wherein a user of the telephone device selects the contact by entering a speed dial code, selecting a special function key, selecting the contact from a menu, selecting the contact from a phonebook, or selecting a link in a page.

23. The telephone device of claim 22, wherein each dialing rule comprises a time to delay before dialing the contact telephone number, and a time to wait for a call to the contact telephone number to be answered.

* * * * *